Dec. 10, 1929.  J. WHITE  1,738,548
HOSPITAL ROLLING COT
Filed Dec. 19, 1927

INVENTOR
Joseph White
BY C. Campbell Hunick
ATTORNEY

Patented Dec. 10, 1929

1,738,548

UNITED STATES PATENT OFFICE

JOSEPH WHITE, OF JERSEY CITY, NEW JERSEY

HOSPITAL ROLLING COT

Application filed December 19, 1927. Serial No. 241,024.

This invention relates to a hospital wheeled cot.

Hospitals have in general use some form of wheeled cot for the transportation of patients from the ambulance to the wards or from the wards to the operating room. These cots are provided with four caster wheels of a larger size than is used on furniture and the wheels are offset from the frame in order that the cot may be more readily rolled about. The top of the cot overhangs the wheels. In pushing the cot into elevators which are not on a level with the floor or other obstruction there is a tendency for the cot to tip if one wheel precedes its mate. Such a tilting is very undesirable as the patient is generally in no condition to be precipitated to the floor from a height of several feet.

One of the objects of this invention is to provide a hospital wheeled cot that will not tilt when passing over a slight obstruction such as a door sill or when being wheeled into and out of an elevator. Still another object of the invention is to provide a safety mechanism to prevent the tilting of a hospital wheeled cot and which mechanism will be only called into play when such tendency exists.

Referring to the drawings.

Figure 1:
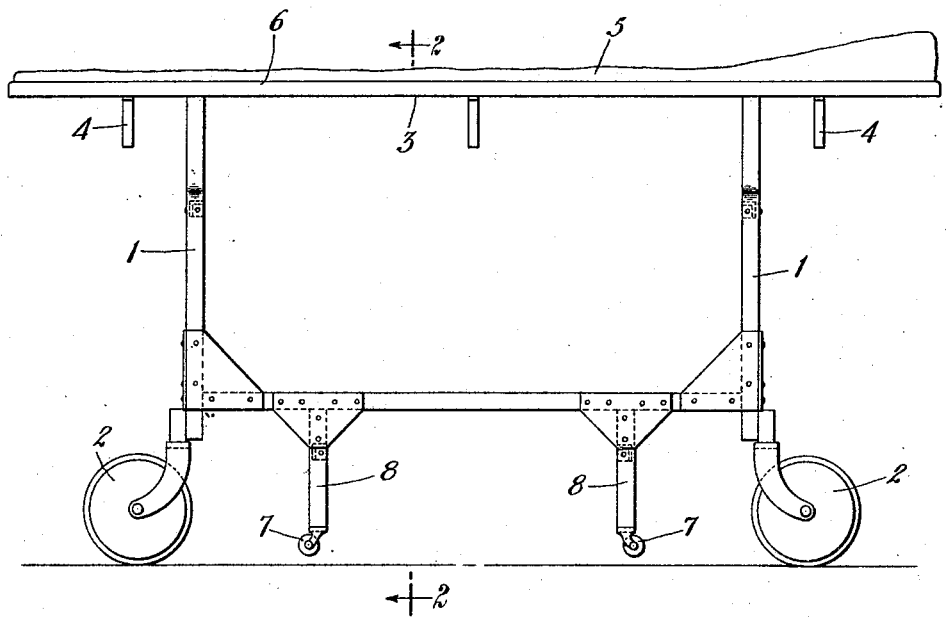
Figure 1 is a side view in elevation of a hospital wheeled cot embodying the principles of my invention.
Figure 2:
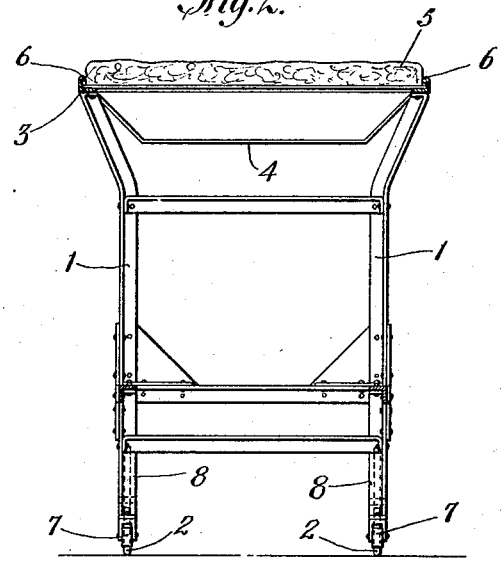
Figure 2 is a cross sectional view of Figure 1 along the line 2, 2, looking in the direction of the arrows.

In carrying out my invention I provide a hospital rolling cot having a frame 1 and casters 2 rotatably secured to said frame 1 but offset therefrom. Frame 1 is preferably made of metal and has a metal top 3. Handles 4 are formed integral with or secured to the bottom side of top 3. Mattress 5 is adapted to rest on top 3 and is held from slipping by rim 6 of frame 1. Secured to the bottom of frame 1 are auxiliary legs 8 adapted to receive casters 7 in the bottom thereof in any well known manner. Legs 8 and casters 7 normally are not in contact with the floor, in other words, are shorter than the distance between the frame and the floor. The purpose of legs 8 and casters 7 is that of auxiliary support and for that reason the distance between the bottoms of casters 7 and the floor is small. As the wheeled cot is rolled over an obstruction such as a sill the casters 2 may swing around in such a fashion as to permit of tilting. The slight drop due to the tilt will bring one or more of the casters 7 into contact with the floor, sill or other obstruction and prevent any further drop or tilt.

The hard and continuous usage that these hospital cots are put to often cause breakdowns which almost always occur in the stem supported by the caster or in the hub of the caster wheel. Such accidents cause an immediate tilting of from five to ten inches and the dropping of the patient on the floor.

My invention is adapted to other uses and I therefore do not desire to be limited in its use to hospital wheeled cots alone.

What I claim is:

1. A hospital rolling cot comprising a frame, mountings at each corner of the frame offset from said frame to rotatably retain caster wheels, auxiliary legs secured to the bottom of said frame on each side thereof behind the front mountings and in front of the rear mountings, and caster wheels for said corner mountings and for said auxiliary legs, said auxiliary legs of such length as to normally maintain said casters secured thereto from contact with the floor.

2. A hospital rolling cot comprising a frame, a rim secured to said frame to prevent movement of the mattress, said frame having four vertical uprights, cross bracing for said frame adjacent the top at the front and back ends, cross bracing for said frame adjacent the bottom of said frame at the front and back ends, longitudial frame members connecting said vertical uprights at the bottom thereof, corner plates secured to said vertical uprights and to said longitudinal members, bearing mountings offset from said uprights, caster wheels rotatably secured in said bearing mountings, auxiliary legs secured to said longitudinal members, and casters rotatably secured to said auxiliary legs, said auxiliary legs of such a length as to normally maintain the casters secured thereto from the floor.

3. A hospital rolling cot comprising a frame, a rim secured to said frame to prevent movement of the mattress, said frame having four vertical uprights, cross bracing for said frame adjacent the top at the front and back ends, cross bracing for said frame adjacent the bottom of said frame at front and back ends, longitudinal frame members connecting said vertical uprights at the bottom thereof, corner plates secured to said vertical uprights and to said longitudinal members, bearing mountings offset from said uprights, caster wheels rotatably secured in said bearing mountings, auxiliary legs secured to said longitudinal members, casters rotatably secured to said auxiliary legs, said auxiliary legs of such a length as to normally maintain the casters secured thereto from the floor, and cross bracing between said longitudinal members and positioned at the junction of said auxiliary legs with said longitudinal members.

Signed at New Jersey, in the county of Hudson and State of New Jersey, this 5th day of December A. D. 1927.

JOSEPH WHITE.